(12) United States Patent
Prest et al.

(10) Patent No.: US 11,807,362 B2
(45) Date of Patent: Nov. 7, 2023

(54) SYSTEMS AND METHODS FOR AUTONOMOUS NAVIGATION AND COMPUTATION OF UNMANNED VEHICLES

(71) Applicant: FLIR Unmanned Aerial Systems ULC, Vancouver (CA)

(72) Inventors: Christopher E. Prest, Waterloo (CA); Jerry Mailloux, Waterloo (CA); David R. Proulx, Guelph (CA); Thomas C. Nagy, Waterloo (CA); David D. Kroetsch, Waterloo (CA); Bradley Benninger, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 409 days.

(21) Appl. No.: 17/079,389

(22) Filed: Oct. 23, 2020

(65) Prior Publication Data
US 2021/0053680 A1 Feb. 25, 2021

Related U.S. Application Data

(63) Continuation of application No. PCT/CA2019/050532, filed on Apr. 25, 2019.

(60) Provisional application No. 62/662,591, filed on Apr. 25, 2018.

(51) Int. Cl.
*B64C 39/02* (2023.01)
*G08G 5/00* (2006.01)
*B64U 101/60* (2023.01)
*B64U 101/31* (2023.01)

(52) U.S. Cl.
CPC ......... *B64C 39/024* (2013.01); *G08G 5/0069* (2013.01); *B64U 2101/31* (2023.01); *B64U 2101/60* (2023.01); *B64U 2201/10* (2023.01); *B64U 2201/20* (2023.01)

(58) Field of Classification Search
CPC .. B64C 39/024; G08G 5/0069; G08G 5/0056; B64U 2101/31; B64U 2101/60; B64U 2201/10; B64U 2201/20; G05D 1/0011; G05D 1/0055; H04N 7/185; H04W 76/19
See application file for complete search history.

(56) References Cited

U.S. PATENT DOCUMENTS

2017/0094527 A1 3/2017 Shattil et al.

OTHER PUBLICATIONS

P. B. Sujit and J. B. Sousa, "Multi-UAV task allocation with communication faults," 2012 American Control Conference (ACC), Montreal, QC, Canada, 2012, pp. 3724-3729, doi: 10.1109/ACC.2012.6315565. (Year: 2012).*

(Continued)

*Primary Examiner* — Alan D Hutchinson
(74) *Attorney, Agent, or Firm* — Haynes and Boone, LLP

(57) ABSTRACT

An unmanned vehicle (UV) navigation system is provided. The UV navigation system comprises a processor, a communication interface for communicating with a remote station, and a non-transitory memory device storing machine-readable instructions that, when executed by the processor, causes the processor to navigate the UV. The processor is configured to receive data from sensors, camera or data line for UV processor analysis, determine that a link-free trigger event has occurred, and autonomously navigate the UV in response to the trigger event.

20 Claims, 10 Drawing Sheets

(56) References Cited

OTHER PUBLICATIONS

Sterbenz, James PG, et al. "Survivable mobile wireless networks: issues, challenges, and research directions." Proceedings of the 1st ACM workshop on Wireless security. 2002. (Year: 2002).*
Christiansen, Reed Siefert, "Design of an Autopilot for Small Unmanned Aerial Vehicles.", Thesis, Aug. 2004, 258 pages, Brigham Young University, Provo, Utah, United States of America.
Chao et al., "Autopilots for Small Fixed-Wing Unmanned Air Vehicles: a Survey.", 2007 International Conference on Mechatronic and Automation, Aug. 2007, 9 pages, IEEE, Harbin, China.
Quincy et al., "An Integrated Command and Control Architecture Concept for Unmanned Systems in the Year 2030", Integrated Project, Jun. 2010, 407 pages, No. NPS-SE-10-003, Naval Postgraduate School, Monterey, California, United States of America.

\* cited by examiner

SYSTEMS AND METHODS FOR AUTONOMOUS NAVIGATION AND COMPUTATION OF UNMANNED VEHICLES

CROSS-REFERENCE TO RELATED APPLICATIONS

This patent application is a continuation of International Patent Application No. PCT/CA2019/050532 filed Apr. 25, 2019 and entitled "Unmanned Vehicle," which is hereby incorporated by reference in its entirety.

International Patent Application No. PCT/CA2019/050532 filed Apr. 25, 2019 claims all benefit including priority to U.S. Provisional Patent Application 62/662,591, filed Apr. 25, 2018, and entitled: "Autonomous Navigation and Computation System," which is hereby incorporated by reference in its entirety.

FIELD

This disclosure generally relates to the field of unmanned vehicles including aerial, land and marine vehicles, and in particular to autonomous navigation and computation systems for unmanned vehicles.

BACKGROUND

UAVs (unmanned aerial vehicles) are typically remotely controlled directly (either by a pilot or by software from a ground station), or operated entirely autonomously (with full mission control capabilities on board the UAV). However, there exists a set of circumstances in which a UAV may need to be remotely controlled for the majority of a mission, but may encounter conditions in which the ground station may be intentionally or unintentionally deactivated or become unreachable.

SUMMARY

The present disclosure provides a new feature for unmanned vehicles (UVs), to correct behavior in those situations. As well, the invention provides for added AI (artificial intelligence) capabilities over what current UVs employ. A distributed navigational and computation system is provided.

In accordance with some embodiments, there is provided an unmanned vehicle (UV) navigation system. The system comprises a processor, a communication interface for communicating with a remote station, and a non-transitory memory device storing machine-readable instructions that, when executed by the processor, causes the processor to navigate the UV. The processor is configured to receive data from sensors, camera or data line for UV processor analysis, determine that a link-free trigger event has occurred, and autonomously navigate the UV in response to the trigger event.

In accordance with some embodiments, there is provided a method for navigating an unmanned vehicle (UV). The method comprises receiving data from sensors, camera or data line for UV processor analysis, determining that a link-free trigger event has occurred, and autonomously navigating the UV in response to the communication link failure or threat detection.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The term unmanned vehicle (UV) is used herein and may include an unmanned aerial vehicle (UAV), an unmanned aircraft (UA), an unmanned aquatic vessel, an unmanned ground vehicle (UGV), and any other vehicle or structure which maybe unmanned, operate autonomously or semi-autonomously, and/or controlled remotely. The UGV may be a remotely controlled, autonomous or semi-autonomous vehicle system which is comprised of a main body and a drive system supported by the main body. In some examples, the drive system is comprised of a propulsion system, such as a motor or engine, and one or more tracks or wheels. Other arrangements, such as a rail or fixed-track ground vehicle, a tether or rope-pulled ground vehicle without a motor or engine, a ground vehicle using balls, sleds or rails, and a ground vehicle which hovers but navigates in proximity to terrain, are also contemplated herein.

Some of the features taught herein are described with reference to embodiments of a UAV by way of example only. However, the description and features may also apply generally to any UV.

Figure 1:
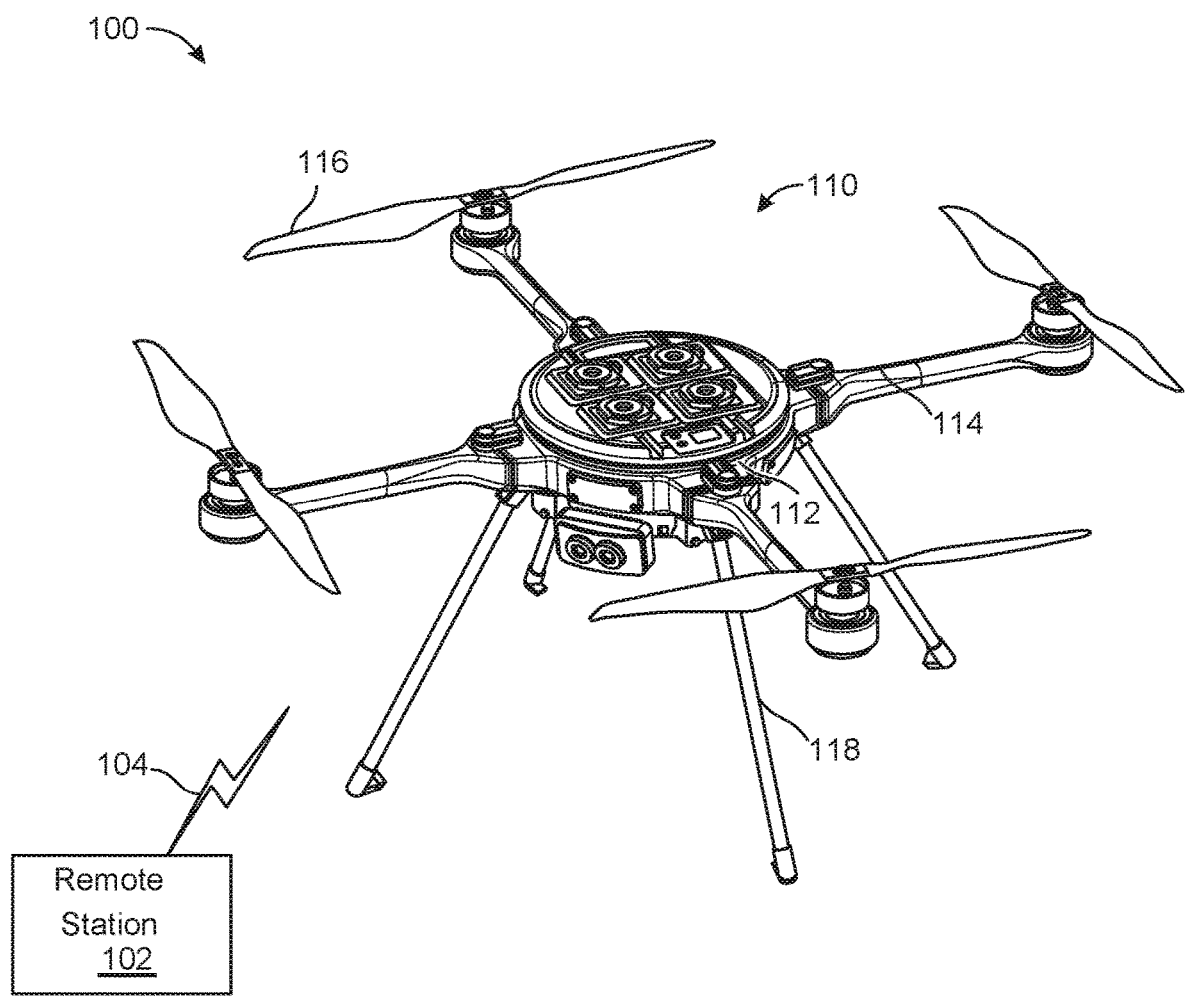
FIG. 1 illustrates an example of an unmanned system (US) comprising an unmanned vehicle (UV) and its associated system elements, in accordance with some embodiments.

FIG. 1 illustrates an example of an unmanned system (US) 100 (such as an unmanned aircraft system) comprising an unmanned vehicle (UV) 110 (such as an unmanned aerial vehicle) and its associated system elements, in accordance with some embodiments. The UV 110 may be designed to operate with no operator (or pilot) onboard. In the embodiment shown in FIG. 1, the unmanned system 100 includes a remote operator (or pilot) station 102 and command and control links 104 between the UV 110 and the remote operator (or pilot) station 102. The command and control links 104 may include any data link for the purposes of managing the movement (e.g., flight) of the UV 110. The UV 110 may operate autonomously without operator (or pilot) intervention in the management of the movement (e.g., flight) during the entire movement (e.g., flight) operation or a portion thereof. The unmanned system 100 may also include other system elements as may be required at any point during movement (e.g., flight) operation.

In some embodiments, UV 110 may be an unmanned aircraft (UA) or UAV as shown in FIG. 1.

The example UV 110 shown in FIG. 1 may include a body 112, arms 114 extending away from the body 112 to support components such as propellers 116, and legs 118 to support the body 112 when UV 110 is positioned on a surface. When not in use, a propeller may be in a folded position. It is understood that propellers 116 may be in the folded position during storage of the UV 110, while the open position is used during flight operation of the UV 110. Although four arms 114 and four legs 118 are illustrated in the embodiment shown in FIG. 1, it is understood that UV 110 may include any other number of arms 114 and legs 118. As noted above, the example of FIG. 1 pertains to a UAV by way of example only. Other types of UVs may also employ the teachings described herein.

In some embodiments, remote pilot (or operator) station 102 may comprise a remote or ground station. In other embodiments, remote pilot (or operator) station 102 may comprise a client device acting as a control station. In still other embodiments, remote pilot (or operator) station 102 may comprise both a remote or ground station and a client device.

Figure 2:
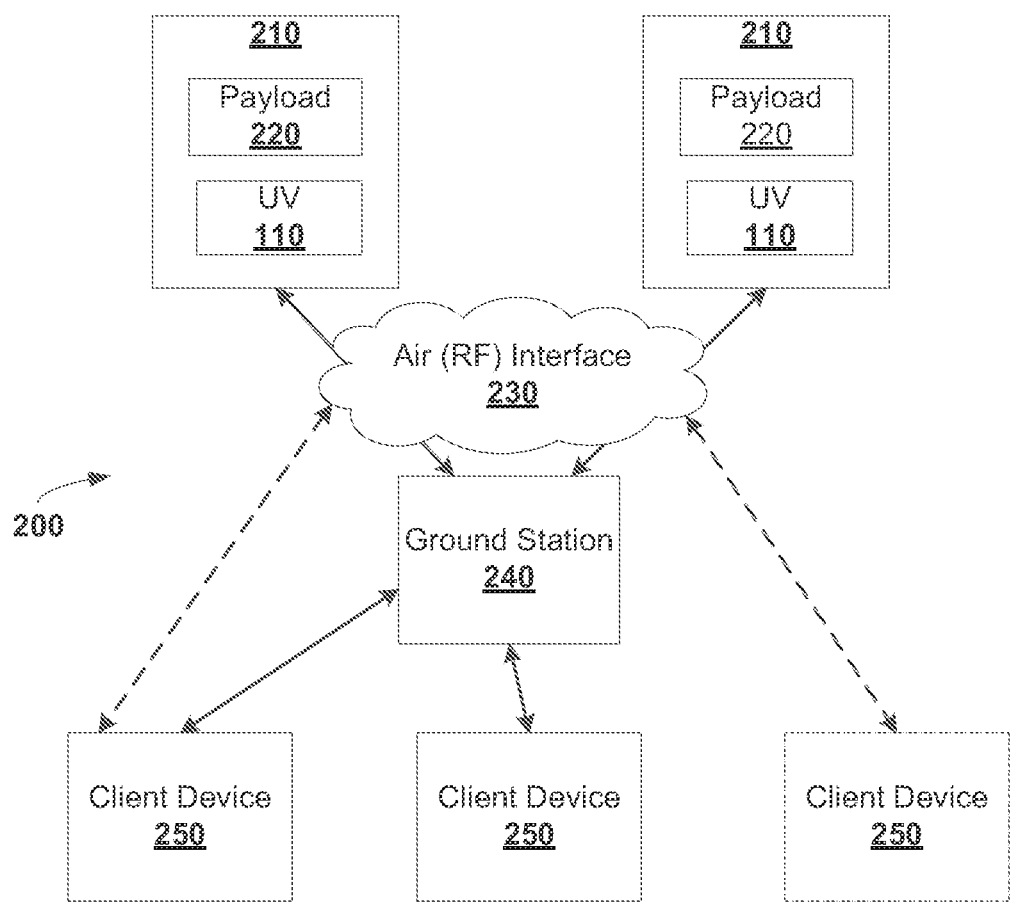
FIG. 2 illustrates, in a component diagram, an example of a US, in accordance with some embodiments.

FIG. 2 illustrates, in a component diagram, an example of a US 200, in accordance with some embodiments. The US 200 may include one or more loaded vehicles 210, a remote or ground station 240, and one or more client devices 250. The US 200 may include more than one remote or ground station 240. A loaded vehicle 210 may include a UV 110 and a payload 220. The remote or ground station 240 may communicate with one or more loaded vehicles 210 via air interface 230 which may include satellite communication or other types of radio frequency communication between station 240 and loaded vehicles 210. The remote or ground station 240 may communicate with one or more client devices 250 through a number of communication links and network interfaces, such as, but not limited to, a wired or wireless local area network (including, but not limited to, WiFi, Bluetooth, and any other wireless protocol), a cellular network (such as global system for mobile (GSM) communication, long-term evolution (LTE), fifth generation (5G), or other cellular networks) or a proprietary or private radio link. In some embodiments, the client device 250 may optionally be configured to act as a remote or ground station and communicate directly with the loaded vehicles 210 via the RF interface 230. In some embodiments, the client device 250 may optionally be configured to communicate with the loaded vehicles 210 via either the remote or ground station 240 and/or directly via the RF interface 230.

A loaded vehicle 210 may include a UV 110 and a payload 220. The payload 220 may include one or more of: a freight package, a camera, a measuring device, one or more sensors, and a storage device (e.g., a universal serial bus (USB) drive). A payload 220 can also include, for example, flame retardant for use in a forest fire. Generally speaking, a payload 220 may be any cargo or equipment a UV 110 carries that is not necessarily required for flight, control, movement, transportation and/or navigation of the UV 110 itself. A payload 220 may be attached or coupled to the UV 110 in a number of ways. For example, a payload 220 may be connected to the UV 110 by one or more interfaces such as, but not limited to, an Ethernet connection, a controller area network (CAN) bus connection, a serial connection, an inter-integrated circuit (I$^2$C) connection, a printed circuit board (PCB) interface, a USB connection, a proprietary physical link, a wireless communication connection such as, but not limited to Bluetooth, WiFI and any other wireless protocol, and so on.

The remote or ground station 240 may be configured to communicate with one or more loaded vehicles 210 (or simply "vehicles 210" hereinafter). The remote or ground station 240 may also communicate with UVs 110 not carrying any payload. The remote or ground station 240 may control devices including, but not limited to, one or more loaded vehicles 210, one or more UVs 110, one or more payloads 220 concurrently in real-time or near real-time. The remote or ground station 240 may also receive commands and/or data from one or more client devices 250, process the commands or data, and transmit the processed commands or data to devices including, but not limited to, one or more vehicles 210, UVs 110, or payloads 220. In some embodiments, the remote or ground station 240 may receive user input directly at a user console (not shown) without client devices 250. In some embodiments, a client device 250 may be the user console for the remote or ground station 240.

A client device 250 may serve to control the operation of devices including, but not limited to, one or more vehicles 210, UVs 110, or payloads 220 remotely. In some embodiments, a client device 250 may also be referred to as a control station. The client device 250 may be implemented as a computing device.

A user, such as an owner or operator of a UV 110, may use a client device 250 to communicate with, and to control, one or more vehicles 210, UAVs 110, or payloads 220. A client device 250 may have an application implemented for communicating with or controlling vehicles 210, UVs 110, or payloads 220. Such an application may be launched as a stand-alone process in an operation system, or within an Internet browser. The user may enter information through a user interface provided by the application. In addition, information relating to, or from, the vehicle 210, UV 110, or payload 220 may be displayed by the application on a display of client device 250. Client device 250 may communicate with, or control, vehicle 210, UV 110, or payload 220 through the remote or ground station 240, or in some embodiments, client device 250 may communicate with, or control, devices including, but not limited to, vehicle 210, UV 110, or payload 220 directly without the remote or ground station 240.

In some embodiments, the client device 250 is operable to register and authenticate users (using a login, unique identifier, biometric information or password for example) prior to providing access to loaded vehicles, payloads, UVs, applications, a local network, network resources, other networks and network security devices. The client device 250 may serve one user or multiple users.

In some embodiments, communication hardware and communication links may include a network interface to enable computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these.

Either or both of the remote or ground station 240 and the client device 250 may be configured to control vehicle 210, UV 110, or payload 220. Flight control, navigation control, movement control, and other types of command signals may be transmitted to the UV 110 for controlling or navigating one or more of vehicle 210, UV 110, or payload 220. Command signals may include command data (e.g., coordinate information) required to execute flight control, movement control or navigation control of one or more of vehicle 210, UV 110, or payload 220.

Either or both of the remote or ground station 240 and the client device 250 may be configured to receive data from one or more of vehicle 210, UV 110, or payload 220. For example, payload 220 may transmit audio, video or photographs to the ground station 240 or the client device 250.

Figure 3:
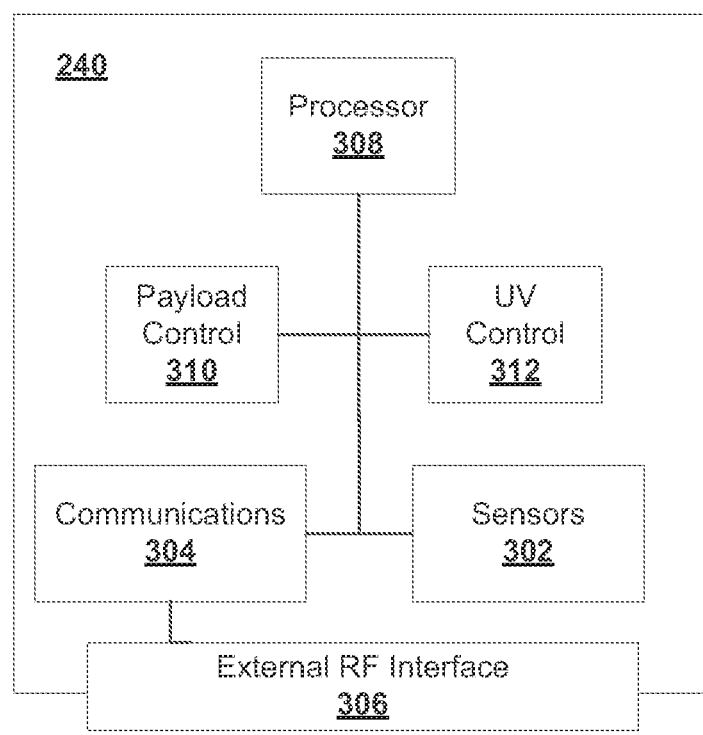
FIG. 3 illustrates, in a component diagram, an example of a remote or ground station, in accordance with some embodiments.

FIG. 3 illustrates, in a component diagram, an example of a remote or ground station 240, in accordance with some embodiments. The remote or ground station 240 may include a sensor subsystem 302 (which may include a global positioning system (GPS) subsystem), a communications module 304 configured to process received data packets, and to prepare data packets for transmission through an external radio frequency (RF) interface 306, an external RF interface configured to communicate with an external RF interface on a UV 110, a processor or controller 308, a payload control module 310, and a UV control module 312. The sensor subsystem 302 may be used to acquire environmental data if the remote or ground station 240 is proximate or near the UV 110, where the environmental data may be used for controlling the UV 110, the payload 220, or the loaded vehicle 210, such as location data, weather data, and so on. The payload control module 310 may generate command signals for controlling the payload 220, and the UV control module 312 may general command signals for controlling the UV 110. Both types of control commands may be processed by the communications module 304 and transmitted to the UV 110 and the payload 220 via external RF interface 306. The remote or ground station 240 may also include an operator console (not shown) that includes a display (not shown) providing video feed from a camera payload on the UV 110. The embodiments described herein refer to a video feed from a camera. It should be understood that the same teachings apply to an image or video feed from the camera.

Figure 4:
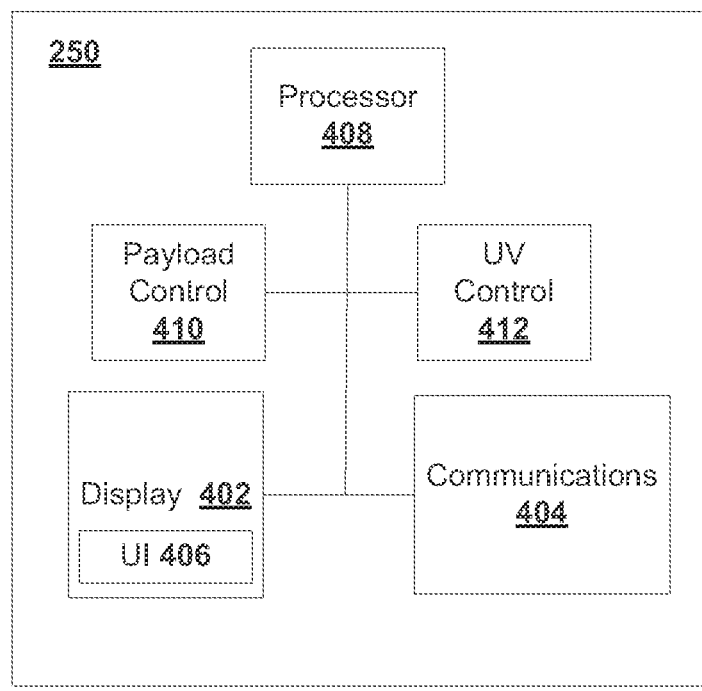
FIG. 4 illustrates, in a component diagram, an example of a client device, in accordance with some embodiments.

FIG. 4 illustrates, in a component diagram, an example of a client device 250, in accordance with some embodiments. The client device 250 may comprise a communications subsystem 404, a processor or central computer system 408 and a display 402. The communications subsystem 404 allows for seamless communications between the client device 250 and UV 110, seamless communications between the client device 250 and payload 220, and seamless communications between the client device 250 and each remote or ground station 240, when remote or ground stations 240 are used. The user interface (UI) 406 is generated by processor 408 for display on the display 402 of a client device 250, which remotely controls the UV 110, the payload 220, and/or the loaded vehicle 210 or as part of a control system for one or more vehicles 210. Display 402 may be a touch-screen display, or a non-touch display. In some embodiments, client device 250 may be on a single-unit computer (e.g., one with a built-in display), or a multi-unit computer (e.g., with a separate display). The payload control module 410 may generate command signals for controlling the payload 220, and the UV control module 412 may general command signals for controlling UV 110. Both types of control commands may be processed by communications module 404 and transmitted to the UV 110 and the payload 220 via the remote or ground station 240.

The client device 250 is configured to display at least a subset of the received vehicle status data for each UV 110 or payload 220 in an interface (such as UI 406, for example). A display 402 may provide a graphical representation of the respective vehicle location data of each of the vehicles 110. Through the interface 406, the client device 250 may receive control command input. The control command input is associated with one of the UV 110 having its vehicle status data displayed in the interface 406. The client device 250 may then transmit the received control command, or a command derived therefrom, to the UV 110. The interface 406 may enable a user to view status and control operation of each of one or more UVs 110 such that the location of each UV 110 is shown in the interface 406, and each UV 110 may be independently controlled through the interface 406 by selecting a particular one of the UV 110 to control. In this way, multiple UV 110 may be monitored and controlled through an interface 406 at the client device 250.

Further detail on the controlling UVs 110 using interface 406 is provided in PCT Application No. PCT/CA2013/000442 entitled "System and Method for Controlling Unmanned Aerial Vehicles", the entire contents of which are hereby incorporated by reference. Client device or control station 250 may control interface panels to display a location of the UV 110.

Figure 5:
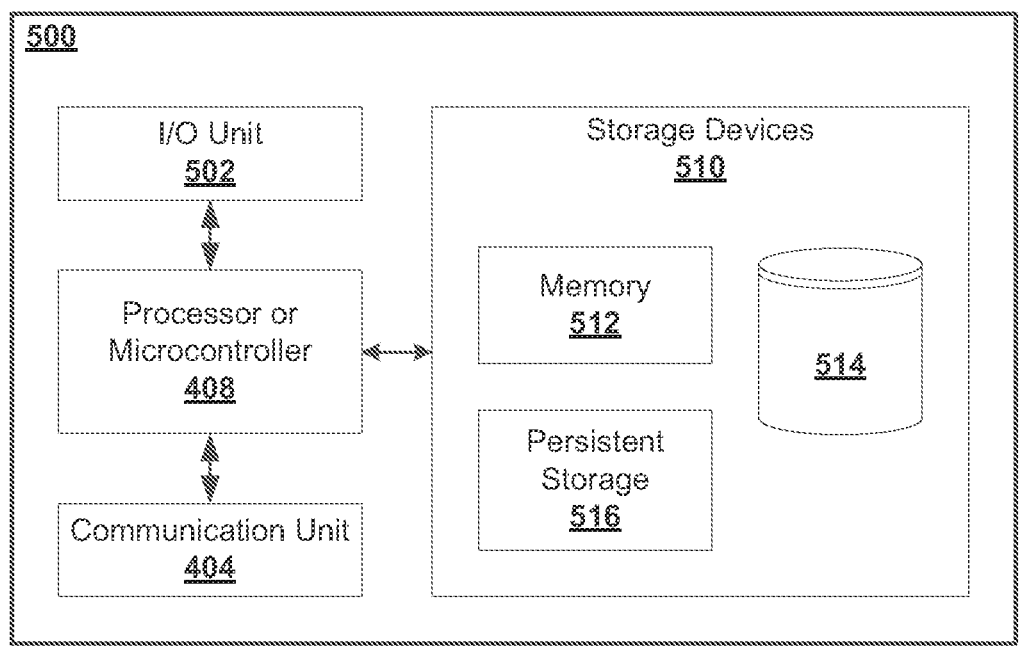
FIG. 5 illustrates, in a component diagram, an example of a control station, in accordance with some embodiments.

FIG. 5 illustrates, in a component diagram, an example of a control station 500, in accordance with some embodiments. The control station 500 may be a client device 250, and/or a remote or ground station 240 having a display, and/or a remote pilot station 102. In some embodiments, the control station 500 may be implemented on a tablet, phone, computer, purpose-built control station or other capable device or system. A processor or controller 408 can execute instructions in memory 512 to configure the communications module 404, the payload control module 410 and the UV control module 412. A processor 408 can be, for example, devices including, but not limited to, any type of general-purpose microprocessor or microcontroller, a digital signal processing (DSP) processor, an integrated circuit, a field programmable gate array (FPGA), a reconfigurable processor, or any combination thereof.

Memory 512 may include a suitable combination of any type of computer memory that is located either internally or externally such as, for example, but not limited to, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 510 include, but are not limited to, memory 512, databases 514, and persistent storage 516.

Each I/O unit 502 enables the control station 500 to interconnect with one or more input devices, such as a keyboard, mouse, camera, touch screen and a microphone, or with one or more output devices, such as a display screen 402 and a speaker. The discussion below will focus on a camera (payload) as an input device and a display 402 as the output device. As will be further described below, UV 110 telemetry readings will also be used as input.

Each communication unit or interface 404 enables the control station 500 to communicate with other components, to exchange data with other components, to access and connect to network resources, to serve applications, and perform other computing applications by connecting to a network (or multiple networks) capable of carrying data including, but not limited to, the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these. For example, a communication interface 506 may include an Ethernet connection to the remote or ground station 240, or a wireless communication interface operable to communicate with remote or ground station 240. In some embodiments, the communication interface 404 may include a RF interface operable to communicate with the UV 110.

Figure 6:
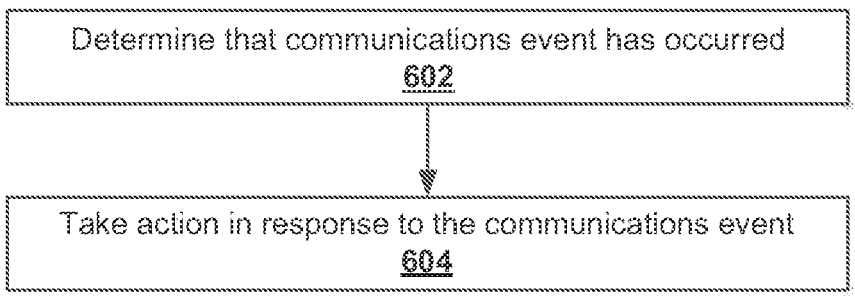
FIG. 6 illustrates, in a flowchart, an example of a method of autonomous navigation, in accordance with some embodiments.

In some embodiments, the UI 406 in a control station 500 (and/or a UI implemented in a remote or ground station 240 having a display; and/or a UI implemented in a remote pilot station 102 having a display) may compute and display an overlay on top of a video feed from a UV 110. In some embodiments, the overlay may comprise a grid showing equivalent distances on the ground. FIG. 6 illustrates, in a screenshot, an example of a grid overlay 602 on a video feed, in accordance with some embodiments. The grid overlay 602 is a milliradian (mRad) overlay comprising a static image with specific characteristics that an observer may then use to mathematically approximate sizes and distances. Other features may be implemented to allow the use of UI elements to calculate linear distances on the ground, drive, fly, move and/or navigate the UV 110 through telemetry information in the absence of a video feed, show navigational features on the grid, and calculate/calibrate errors in the GPS.

Link-Free Mode Operation

As noted above, the communications link between the control station 500 and the UV (or vehicle) comprises one or more wireless communications links. The terms "vehicle" and UV are used interchangeable herein. In one embodiment, the control station 500 communicates directly with the vehicle using one or more communications links. In one embodiment, the control station 500 communicates directly with at least one intermediary station, which then relays or translates the communications and sends them through another communications link to the vehicle, while accepting communications from the vehicle and relaying or translating them and sending them through a communications link to the control station 500. In some embodiments, a user device may act as a control station 500 and communicate directly with a vehicle.

FIG. 6 illustrates, in a flowchart, an example of a method of autonomous navigation 600, in accordance with some embodiments. The method 600 comprises determining that a communications failure has occurred 602, and taking action 604 in response to the communications failure. In some embodiments, determine that a communications failure has occurred 602 comprises the loss of the communications link between the UV and its corresponding control station 500. Other steps may be added to the method 600, such as, but not limited to, receiving data from sensors, camera or data line for UV processor analysis.

Figure 7:
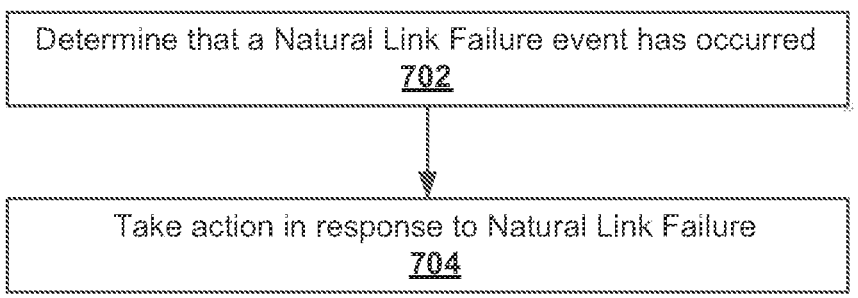
FIG. 7 illustrates, in a flowchart, another example of a method of autonomous navigation, in accordance with some embodiments.

In certain situations, the loss of the communications link between an unmanned vehicle and its corresponding control station 500 may be the result of atmospheric conditions, RF obstructing obstacles or terrain, extreme distance between the vehicle and the control station 500, or other natural phenomena (Natural Link Failure). FIG. 7 illustrates, in a flowchart, another example of a method of autonomous navigation 700, in accordance with some embodiments. In these conditions, it may be preferable, in the event of a communications natural link failure 702, for the vehicle to take certain actions 704. Preferably, these actions would cause the vehicle to return to a known location. For example, in the case of an aerial vehicle, preferably the vehicle would return to its home base and descend to ground level.

Figure 8:
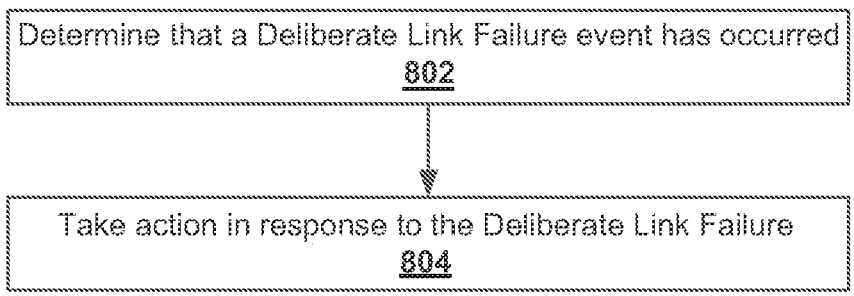
FIG. 8 illustrates, in a flowchart, another example of a method of autonomous navigation, in accordance with some embodiments.

In other situations, the loss of the communications link between an unmanned vehicle and its corresponding control station 500 may be the result of deliberate interference, or the result of deliberate deactivation of the link to prevent detection of the location of either the vehicle or the control station 500, or some other reason (Deliberate Link Failure). FIG. 8 illustrates, in a flowchart, another example of a method of autonomous navigation 800, in accordance with some embodiments. In these conditions, it may be preferable, in the event of a communications link failure 802, for the vehicle to take certain actions 804, which actions are preferably different from those it would take in circumstances of natural link failure. Preferably, these actions would cause the vehicle to continue its pre-set course or pre-programmed mission, or use on-board logic to determine a new course of action in the absence of a communications link.

Figure 9:
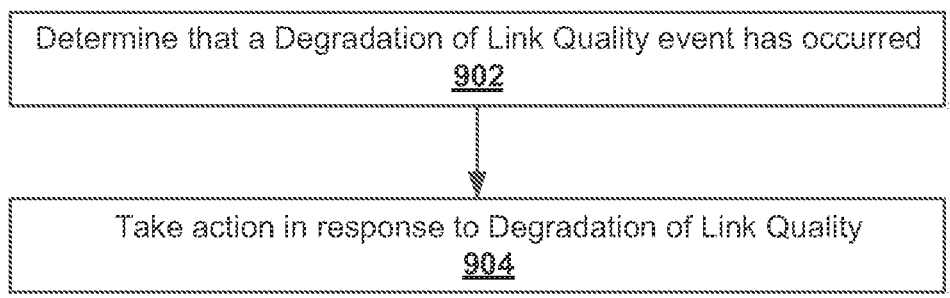
FIG. 9 illustrates, in a flowchart, another example of a method of autonomous navigation, in accordance with some embodiments.

In other situations, there may not be complete loss of the communications link, only degradation of the quality of the link. The degradation of link quality may be determined as a change from a baseline value in a metric such as throughput, the variance or standard deviation of throughput, packet latency, packet loss rate, or any other metric of communications link quality. FIG. 9 illustrates, in a flowchart, another example of a method of autonomous navigation 900, in accordance with some embodiments. In these conditions, it may be preferable, in the event of a communications link failure 902, for the vehicle to take certain actions 904, which actions are preferably different from those it would take in circumstances of natural link failure. Preferably, these actions would cause the vehicle to continue its pre-set course or pre-programmed mission, or use on-board logic to determine a new course of action in the absence of a communications link.

Preferably, a processing subsystem on the vehicle contains a variable (Link-free Mode Enable) which corresponds to the enablement of Link-free Mode operation. This variable may be programmatically set or cleared by the vehicle's processing subsystem, possibly as a result of receiving a command from the control station 500. The user interface on the control station 500 may have an option to set or clear the mode of continued autonomous operation in the absence of a communications link (Link-free Mode)—preferably, selecting this option causes the control station 500 to send a command to the vehicle through the communications link, upon reception of which command the vehicle sets or clears the Link-free Mode Enable variable. In some embodiments, Link-free Mode operation may only be implemented on the vehicle with no other mode of operation, obviating the need for a user interface option to enable or disable Link-free Mode. In some embodiments, another communications system may be used to signal to the vehicle to enable or disable Link-free Mode. In some embodiments, logic onboard the vehicle may be used to autonomously enable or disable Link-free Mode (see section below, Autonomous Link-free Mode Enablement).

Under normal operation, a vehicle may be controlled remotely, through a communications link with a separate control station 500. In some embodiments, the vehicle has a subsystem for measuring the reliability of the communications link (Link Fail Test).

Figure 10:
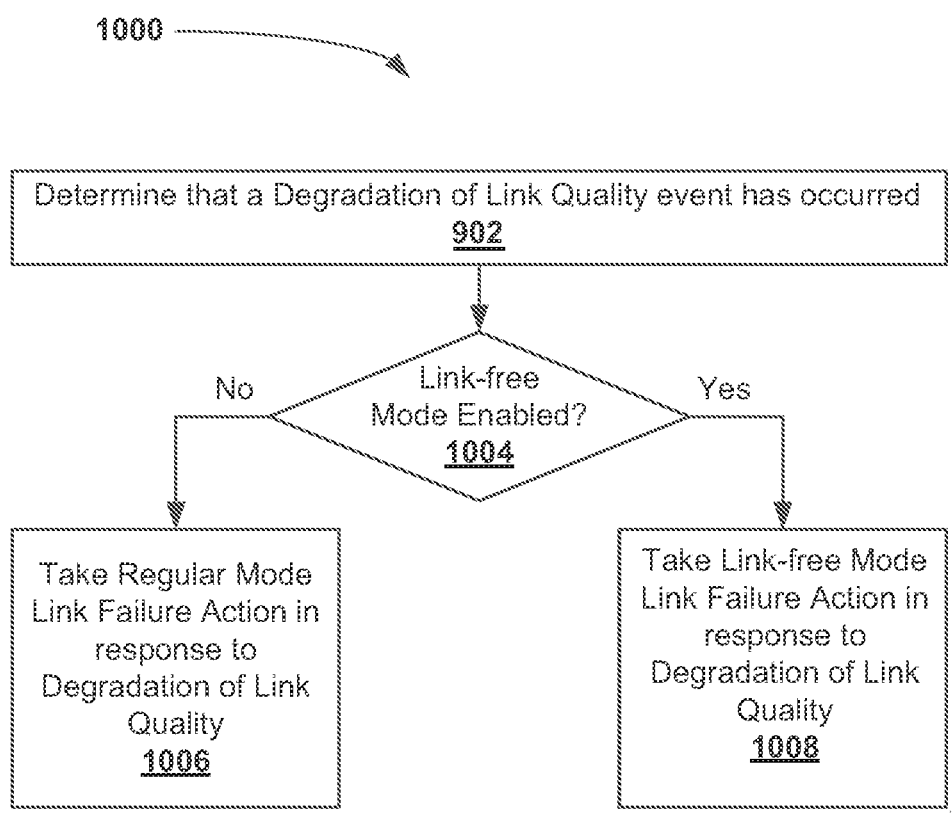
FIGS. 10 and 11 illustrate, in flowcharts, other examples of a method of autonomous navigation, in accordance with some embodiments.
Figure 11:
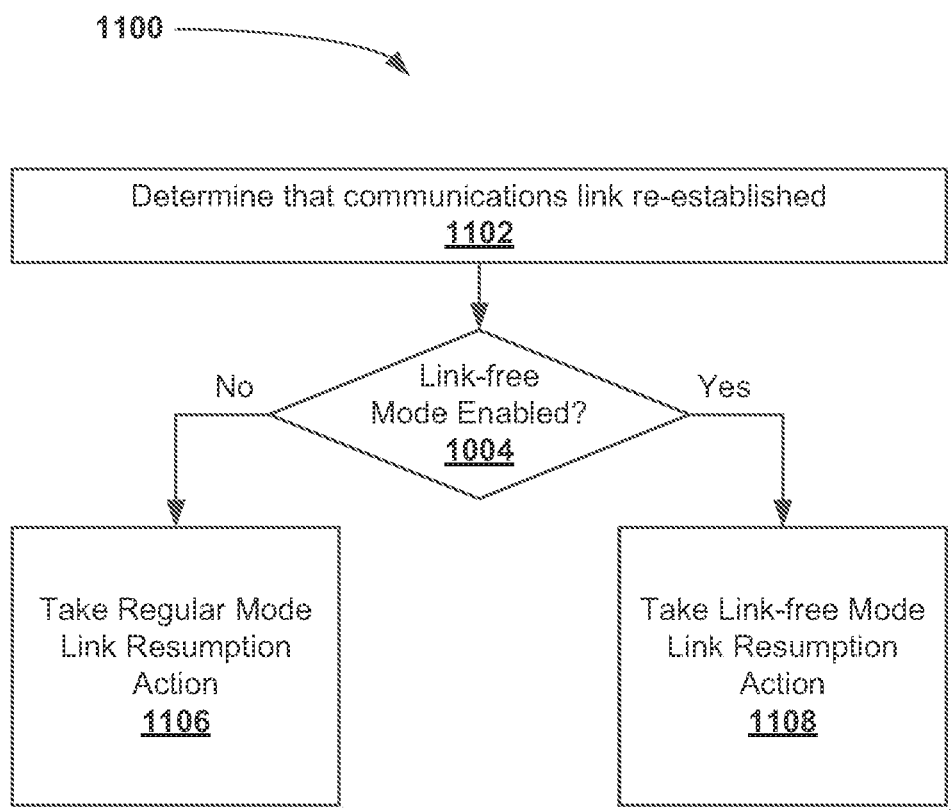

FIGS. 10 and 11 illustrate, in flowcharts, other examples of a method of autonomous navigation 1000, 1100, in accordance with some embodiments. If Link-free Mode Enable is not set 1004 and the measure of the communications link's reliability falls below a particular value 902, the vehicle may take a corresponding action or set of actions (Regular Mode Link Failure Action) 1006. If, during this action or set of actions, the communications link once again becomes available 1102, the vehicle may take a corresponding action or set of actions (Regular Mode Link Resumption Action) 1106.

If Link-free Mode Enable is set 1004 and the measure of the communications link's reliability falls below a particular value 902, the vehicle may take a corresponding action or set of actions (Link-free Mode Link Failure Action) 1008. If, during this action or set of actions, the communications link once again becomes available 1102, the vehicle may take a corresponding action or set of actions (Link-free Mode Link Resumption Action) 1108.

The Link Fail Test may be any way of measuring the reliability of a communications link such that one result or set of results returned from the test indicates that the link is unusable for communications, and another result or set of results indicates that the link may be relied on for communications. In some embodiments, a Link Fail Test comprises a software subsystem which sets a timer for a particular timeout, monitors the link for incoming data, and resets the timer whenever a data packet is properly received. If the timer elapses without data having been received since the timer was set, a timer-handling routine notifies another component of the processing subsystem (e.g., through a shared state variable) that the link has failed. If a packet is subsequently received, the software subsystem resets the shared variable to indicate that the link is reliable.

In some embodiments, a Link Fail Test comprises a software subsystem which maps the communications link's signal strength to a range, with the value at one end of the range indicating a completely failed link, the value at the other end of the range indicating a perfectly-functioning link, and the values between those two ends indicating varying degrees of link reliability.

In some embodiments, a Link Fail Test comprises a hardware subsystem comprising a radio-frequency tuner and a signal strength indicator, arranged such that the communications link (assumed for this embodiment to be a radio-frequency wireless link) is first filtered to only pass a specific frequency as selected by the tuner, and then has its amplitude measured by the signal strength indicator, with the output of the indicator being proportional to the link reliability.

In some embodiments, the Link Fail Test may measure the communication link's success rate in sending and/or receiving packets, may monitor for the presence of a wireless signal carrier, or may use any of the known systems for assessing communications link quality.

The Regular Mode Link Failure Action 1006 is an action or set of actions which preferably causes the vehicle to return to a known safe state and cease operations. Optionally, it may be any action, or no action. In some embodiments, for a UAV, the Regular Mode Link Failure Action is to control the UAV to return to its point of origin from whence it departed, return to ground level and turn off all motors. Optionally, the Regular Mode Link Failure Action 1006 may be for a UAV to hover for a fixed or adjustable period of time, and then return to its point of origin. Optionally, the Regular Mode Link Failure Action 1006 may be for the UV or UAV to continue its previous actions. Optionally, the Regular Mode Link Failure Action 1006 may consist of no action, or any action.

The Link-free Mode Link Failure Action 1008 is an action or set of actions which preferably causes the vehicle to begin to operate autonomously. Preferably, the Link-free Mode Link Failure Action 1008 comprises at least the continued performance of an action or actions or mission which the vehicle was previously commanded to perform. Optionally, the Link-free Mode Link Failure Action 1008 comprises the continued monitoring of the communications link, and the resumption of regular (non-autonomous) vehicle operation if the communications link becomes available again. Optionally, the Link-free Mode Link Failure Action 1008 comprises waiting or hovering for a fixed or adjustable period of time following the completion of a previously-commanded action or mission, and then controlling the vehicle to return to its place of origin. Optionally, the Link-free Mode Link Failure Action 1008 comprises setting a timeout timer when the communications link is determined to be unreliable, continuing to perform Link-free Mode Link Failure Actions 1008, and upon the expiry of the timeout timer, ceasing performance of the previously-commanded actions or mission and controlling the vehicle to return to its place of origin. Optionally, the Link-Free Mode Link Failure Action 1008 comprises deactivating the wireless transmitter on the vehicle and optionally re-activating it when it is detected that the control station is attempting to reactivate the communications link. Optionally, the Link-free Mode Link Failure Action 1008 comprises the vehicle ceasing streaming video or photos and instead storing that video and those photos, optionally in modified form, in an internal memory store on the vehicle. Optionally, the Link-free Mode Link Failure Action 1008 comprises reducing the number of wireless communications sent in a given timeframe in order to draw less attention to the vehicle. Optionally, the Link-Free Mode Link Failure Action 1008 consists of no action, or any other action.

The Regular Mode Link Resumption Action 1106 is an action or set of actions which preferably control the vehicle to hover or stop moving. Optionally, the Regular Mode Link Resumption Action 1106 comprises continuation of the in-progress action, or continuation of the action in progress before the link was determined to be unreliable. Optionally, the Regular Mode Link Resumption Action 1106 consists of no action, or any action.

The Link-free Mode Link Resumption Action 1108 is an action or set of actions which preferably control the vehicle to hover or stop moving. Optionally, Link-free Mode Link Resumption Action 1108 comprises continuation of the in-progress action, or continuation of the action in progress before the link was determined to be unreliable. Optionally, Link-free Mode Link Resumption Action 1108 comprises controlling the vehicle to return to its point of origin. Optionally, Link-free Mode Link Resumption Action 1108 consists of no action, or any action.

Autonomous Link-Free Mode Enablement

Link-free mode may be autonomously enabled by the vehicle under certain trigger conditions other than the failure of the communications link. In these cases, when the trigger condition is determined to be fulfilled, the vehicle immediately enters Link-free mode and begins to perform the Link-free Mode Link Failure Action 1008. Optionally, the trigger condition may be the detection, through an on-board surveillance subsystem, of a pre-determined target whose image or other data may have been uploaded to the vehicle from the control station 500 and whose identity may have been selected for autonomous detection by the control station 500. Optionally, the trigger condition may be the detection of a change in a characteristic of a specified target, examples of such characteristics being location or type of movement. Optionally, the trigger condition may be the detection of an indication that the presence of the vehicle has been detected by a hostile party. Optionally, the trigger condition may be the detection of a threat such as, but not limited to a temperature threat, a chemical threat, a biological threat, a radiation threat, or any threat of nature. Optionally, the trigger condition may be a mapped location for restricted service use.

Optionally, the trigger condition may be the detection, by the vehicle's communication subsystem or by another wireless sensing subsystem, of jamming or attempted jamming of the communications link.

The listing of trigger conditions in this section is not meant to be exhaustive.

For autonomous trigger condition-based engagement of Link-free mode, the Link-free Mode Link Failure Action 1008 preferably comprises the deactivation of the vehicle's wireless transmitter, and optionally comprises any of the Link-free Mode Link Failure Actions 1008 list above. Optionally, the Link-free Mode Link Failure Action 1008 comprises communicating to the control station 500, before an optional deactivation of the communications link, the trigger condition which was determined to be fulfilled. Optionally, if the vehicle detected jamming or attempted jamming of the communications link, the Link-free Mode Link Failure Action 1008 comprises modifying the vehicle's mission or flight plan to avoid areas wherein, through a combination of sensing, calculation and mapping, the vehicle's navigational planning subsystem determines there may be jamming of the vehicle's communications link.

In some embodiments, this system allows for a scripting system which allows for the creation of a trigger-response logic script. In some embodiments, the scripting system allows for specified triggers to activate specified actions. A list of triggers may be available for allocation to specific actions, and the user may create these mappings in a downloadable mapping script. This script may be generated from user input at the control station 500 and sent to the UAV or UV.

The triggers may be such events as, but not limited to, the detection of jamming of the radio link or other electronic countermeasures, mission events such as arrival at waypoint, the accumulation of certain data, the loss of a radio link or the regaining of a radio link.

The actions these triggers may initiate may be such actions as, but not limited to, the UAV or UV returning to its home base, dropping a package at a specific set of coordinates, modifying its travel or flight path or elevation, looking for a specified target, turning a radio on or off, taking a picture, changing camera settings, changing radio settings, alerting a user, alerting a control station, sending an alert, or some other action.

A more complex scripting system may use a set of templates to create a mission specific to the mission assets and requirements available. For example, a reconnaissance mission template may automatically create a set of waypoints for complete reconnaissance coverage of a target, and may use available data to determine the routing of the UV or UAV. Factors which the system may use to dynamically create a flight plan and triggers may include, for example, the location of unfriendly assets or personnel, wind speed, the acoustic signature of the UV or UAV, the location of the sun relative to the UV or UAV at the time of the mission, the visual signature of the UV or UAV, the estimated maximum time duration that the UAV can fly without landing, the selection and capabilities of sensors on board the UV or UAV, and the selection and capabilities of other mission assets available (such as other UVs or UAVs and their sensors, ground-based unmanned vehicles, personnel, or other infrastructure elements).

By way of example, the system may recognize that one UV or UAV has an onboard camera while another proximate UV or UAV has a radiation detector. If a reconnaissance template is used to create a mission, the system may utilize both UVs or UAVs and create complementary flight or travel plans for each UAV or UV which keep the UAVs or UVs away from unfriendly personnel or conditions such as, but not limited to, extreme temperature, fire, chemical plume, radiation source, etc. (with the distance determined by the windspeed and acoustic signature of the UAV or UV in question) and maneuver the UAVs or UVs along a path which allows them to completely photograph and radiation-detect the target area.

A UV or UAV may be detected by unfriendly parties who may be monitoring the radio spectrum and may detect radio transmissions by the UV or UAV. Therefore, it may be important to identify locations or regions (Dark Zones) within which a UV or UAV's radio transmissions may signal the presence of the UV or UAV to unfriendly parties. The UV, UAV, UV system or UAV system may identify from a map, be told through user input, or may determine through sensing or inference from other known data that a certain region should be considered a Dark Zone. When entering a Dark Zone, the UV or UAV may then autonomously initiate Link-Free Mode and inhibit radio transmissions. Optionally, the UV or UAV may re-enable radio transmissions once the UV or UAV detects that it is no longer in a Dark Zone. The initiation and ending of Link-Free Mode may be programmatically determined on-board the UV or UAV, or may be accomplished through the scripting system described above.

The system may identify one or more waypoints (Known Good Communications Waypoints, or KGCW) from where a UV or UAV may safely communicate. For example, areas or zones where it is determined via a map and GPS combination, information provided through user input, or determined through sensing or inference from other known data that a certain region or zone is safe. If a mission requires that the UV or UAV operate in a Dark Zone, but also requires communication from the UV or UAV to a control station 500, the system or operator may plan a flight or travel path which causes the UAV or UV to leave the Dark Zone and move to a KGCW when a trigger occurs.

For example, a number of potential targets may be present within a Dark Zone. The UV or UAV may not be able to autonomously identify which target is the true target on its own, and requires the operator to manually perform this identification. The UV or UAV may therefore be programmed to move into a Dark Zone, enter Link-Free Mode and thereby disable radio transmissions, trigger the collection and saving of data for later transmission, autonomously photograph and/or run sensor analysis on each target and record its position, move out of the Dark Zone to a KGCW, re-enable radio transmissions, and transmit the photographs back to the operator. The operator may then identify which of the photographs represent targets, and instruct the UV or UAV to surveil or attack those targets. The UV or UAV may then move back into the Dark Zone, enter Link-Free Mode and thereby disable radio transmissions, and carry out the mission. In some embodiments, the UV or UAV may enter Link-Free Mode prior to moving back into the Dark Zone.

One refinement of the Known Good Communications Waypoint is a measure or estimate of how much the system may safely transmit (Safe To Transmit, or STT). This may be a continuous variable representing a spectrum of possible values, a discrete variable representing a finite number of possibilities, or a boolean safe/unsafe variable. A high or safe value for STT indicates that radio traffic should be unimpeded, while a low or unsafe value for STT indicates that radio traffic should be reduced to avoid detection of the UV or UAV by unfriendly parties. A UV or UAV at a KGCW with a low STT may partially inhibit, but not entirely disable, radio transmission, to reduce the possibility of detection while still transmitting data. This inhibiting may be accomplished by lowering the transmit power on the UV or UAV's radio transmitter, changing radio frequencies one or more times, transmitting very infrequently, reducing the amount of data transmitted, transmitting only in short bursts, or transmitting at irregular intervals.

Another refinement of the Known Good Communications Waypoint is the expansion of the KGCW into a Known Good Communications Zone, which is a bounded region within which the STT level is no lower or no more unsafe than a particular threshold. Essentially, it is a zone from which the UAV may transmit.

Additional Improvements and Example Embodiments

In order to accomplish the autonomous target detection described above, in one embodiment, the vehicle's on-board software system comprises an AI (artificial intelligence) subsystem. A number of additional improvements may be implemented in the vehicle.

Performing actions requiring image processing or video processing on an autonomous vehicle usually requires transmitting the images or video over the communications link back to a control station 500 or other processing entity, since traditionally vehicles generally have neither the AI subsystem nor the processing power to implement such a subsystem. In such a configuration, much bandwidth must be used to transmit images or video in real-time to the processing entity; typically, the video must be degraded in resolution or frame-rate in order for the communications latency not to be too high for a given application. This is especially an issue with UAVs (unmanned aerial vehicles), where weight and fuel/battery considerations limit the amount of processing power that has typically been designed into the vehicle.

In one embodiment, the vehicle's on-board software system comprises an AI subsystem, which AI subsystem may be enabled to perform object identification, object detection and object tracking. Preferably, the AI subsystem may be enabled to perform object identification, object detection and object tracking when the communications link has been disabled.

Target Tracking Application

In one embodiment, a target image is uploaded from the control station 500 through the communications link, and this image is used by the AI subsystem's object detection subsystem to identify and/or detect a target. A real-time video or series of still images from a camera on the vehicle may be used as a real-time video feed by the object detection subsystem, in conjunction with the target image uploaded from the control station 500. When the object detection subsystem detects and/or identifies that the object shown in the target image has appeared in the real-time video, the object detection subsystem may direct the vehicle to take an action. Optionally, many images may be uploaded from the control station 500. Optionally, the AI subsystem may be enabled to be trained to detect and/or identify the object. Optionally, the training data required for the AI subsystem to detect and/or identify the object may be uploaded directly to the vehicle through a communications link, a serial port or a memory card. Optionally, the AI subsystem's training data may be downloaded from the vehicle through a communications link, a serial port or a memory card. Optionally, the action taken may comprise calculating the real-world location of the detected object either in absolute coordinates or relative to the vehicle. Optionally, the action taken may comprise notifying the control station 500 that the target image has been detected and/or identified in the real-time video. Optionally, the action taken may comprise entering Link-Free Mode and disabling the communications link. Optionally, the action take may comprise leaving Link-Free Mode and re-enabling a previously-disabled communications link. Optionally, the action taken may comprise re-orienting the vehicle. Optionally, the action taken may comprise controlling the vehicle to move relative to the detected and/or identified object, and optionally detect if the object moves, and follow it. Optionally, the action take may comprise aiming and optionally firing a weapon at the detected object. Optionally, the action taken may comprise transmitting to the control station 500 information about the vehicle's immediate surroundings, where such information may include location coordinates, photographs of the surroundings, temperature readings, or any other information about the vehicle's or detected and/or identified object's surroundings. Optionally, the action taken may comprise transmitting to the control station 500 information about the detected and/or identified object's characteristics, such as movement, change in size or shape, disappearance or reappearance, or any other change in a characteristic of the detected and/or identified object.

Target Following Application

In one embodiment, the software on the vehicle is enabled for object tracking, such that when the vehicle is commanded by the control station 500 to enter tracking mode upon detection and/or identification of the target, and the target object is detected and/or identified, the object tracking subsystem in the vehicle's software system controls the vehicle to follow the detected and/or identified object. Preferably, the vehicle's software system controls the vehicle to follow the detected and/or identified object such that the vehicle maintains a specified distance from the object. Optionally, the vehicle's software system controls the camera on the vehicle to photograph or capture video of the detected and/or identified object. In some embodiments, the object may comprise, but is not limited to, a vehicle, structure, a chemical plume, a radiation plume, or any other threat.

Defect Detection Application

In one embodiment, the AI subsystem may be enabled for the vehicle to perform defect detection in physical structures through the location of the structure being known to the vehicle, the vehicle maneuvering itself to a distance from and orientation to the physical structure suitable for image or video acquisition, acquiring images or video of the structure, and performing defect detection on the structure. Preferably, the AI subsystem may be enabled to receive training data to be able to recognize a defect in a physical structure. Preferably, the AI subsystem may be enabled to recognize the intended physical structure such that the vehicle may maneuver itself directly to the vicinity of the physical structure without having been given the coordinates of the structure. Optionally, the vehicle may be enabled to receive coordinates of the structure through its communications link. Optionally, the vehicle may be enabled to receive the coordinates of more than one structure through its communications link, and may be enabled to be commanded by the control station 500 to perform defect detection on a first structure and then maneuver to another structure to perform defect detection. Preferably the vehicle may be commanded to take an action upon successfully detecting a defect. Optionally, the action may comprise zooming in the camera on the defect and taking a photo, recording the time and location of the defect detection, communicating the status of the defect detection to the control station 500, or transmitting any photos taken of the defect to the control station 500. The vehicle may be enabled to perform the above tasks in the absence of a functioning radio link, only communicating the defect information when a radio link may be re-established, or determining a KGCW and returning to it periodically to communicate defect information.

Site Security Application

In one embodiment, the vehicle may be enabled to perform site security. In this configuration, the AI object detection subsystem is preferably enabled to detect any person as its target, but optionally may be enabled to detect any other object or objects as its target. Preferably, the control station 500 communicates at least one exclusion zone, comprising a geographic area, to the vehicle. Preferably, the control station 500 commands the vehicle to move through a certain path while observing the at least one exclusion zone with the vehicle's camera, and processing the images or video acquired by the camera through the object detection subsystem; preferably the vehicle is enabled to follow this path and perform the observation and detection without communicating any images or video through the communications link. Preferably, upon the object detection subsystem detecting its at least one target and calculating that the target's location is within the exclusion zone, the vehicle's software commands the vehicle to take an action. Preferably, the action taken comprises stopping moving through the specified path. Preferably, the action taken comprises following the detected target. Preferably, the action taken comprises sending the control station 500 a communication indicating that a target has been detected, which communication may include a photograph or video image. Optionally, the action taken comprises firing a weapon. Optionally, the action taken comprises activating a visible or audible warning device. Preferably, the action taken comprises the vehicle resuming, when commanded to do so by the control station 500, moving through the specified path and performing the observation and detection. Optionally, the action taken comprises the vehicle autonomously resuming moving through the specified path and performing the observation and detection.

Target Identification and Video Overlay Application

In one embodiment, the vehicle may be enabled to perform object or situation detection in a real-time video feed and/or sensor output being sent to the control station 500 or another client station. Preferably, the AI subsystem may be enabled to detect at least one target object in its video feed. Optionally, the target object may be a weapon. Optionally, the target object may be a person with a weapon. Optionally, the target object may be any face. Optionally, the target object may be any human form. Optionally, the target object may be a person in a specific uniform or class of uniforms. Optionally, the target situation may be extreme temperature, chemical, biologic or radiation threat. Optionally, upon the AI subsystem detecting a target object in the video feed, the vehicle's software performs an action. Optionally, this action may comprise taking additional photos zoomed in to the target. Optionally, this action may comprise re-enabling a previously-disabled communications link and optionally communicating a notification of object detection to the control station 500. Optionally, the AI subsystem calculates a bounding box for each target object detected in the video feed, the bounding box being a set of points which mostly or entirely encloses the target object in each frame of video. Preferably, the AI subsystem calculates a confidence score for each target object in the video feed, the confidence score being a measure of how closely the detected object matches the AI subsystem's intended target object. Optionally, the vehicle communicates, frame by frame, along with or as part of the real-time video feed, the data required to display the bounding box as an overlay onto the video feed. Optionally, the vehicle communicates, for each bounding box, the identification of which object it has detected within that bounding box. Optionally, the vehicle communicates, for each bounding box, the confidence score with which it has detected the target object within that bounding box. Optionally, the receiving station interprets and renders the received bounding box data and displays the bounding box as an overlay on the video. Optionally, the receiving station may, for each bounding box, display the confidence score associated with that bounding box. Preferably, the receiving station stores the received bounding box data as metadata, with the video. Optionally, the vehicle renders the bounding box and overlays the bounding box onto the video image before transmitting the video. Optionally, the receiving station may render the received bounding box differently, for example in a different color or style, depending on the object identification information. Optionally, the receiving station may render the bounding boxes for one class of objects differently, for example in a different color or style, from the bounding boxes for other objects. Optionally, if the target object is any person in a specific class of uniforms, the receiving station may identify the bounding box for that target object as a person belonging to a specific team or service or affiliation or force or rank. Optionally, the receiving station may display a count of the number of target objects of each target object type. Optionally, the receiving station may display a count of the number of target objects of each class of target object.

It should be understood that in the above description, any object highlighting technique may be substituted for the bounding box. One object highlighting technique is the detection of the edge of the object and the filling in with opaque or semi-transparent colour or hatching or shading of the object. One object highlighting technique is the rendering of an arrow or other symbol with the arrowhead or other symbol element indicating the object being highlighted.

In one embodiment, the AI subsystem may provide the vehicle's software the necessary information to aim and zoom the camera such that a target object occupies most or all of a camera's image. Preferably, the vehicle's software instructs the camera to acquire an image or video. Preferably, the vehicle sends the image or video to the control station 500. Optionally, the vehicle calculates and sends the location of the target object with the image or video. Optionally, the vehicle then re-aims and re-zooms the camera so that another target object occupies most or all of the camera's image, and the prior steps iterate, sending individual images or video to the control station 500 in turn. Optionally, as the images or video are received by the control station 500, the control station 500 sends them to a central processing system which matches the targets against a database of known targets. Optionally, if the central processing system matches an acquired target image to an image in its database (a known target), the central processing system notifies the control station 500 and provides identifying information about the target to the control station 500. Preferably, the control station 500 shows an overview image captured by the vehicle, with any and all known targets identified through the user interface. Preferably, the known targets are identified on the user interface with an object highlighting technique. Preferably, in response to a user interaction, the control station 500 displays the information from the central processing system's database on the user-selected target.

Other Uses

The teachings of the present disclosure may be used with any system or vehicle where a vehicle is being remotely controlled. It may be used with hovering or non-hovering unmanned aerial vehicles, hovering and non-hovering manned aerial vehicles, manned and unmanned marine vehicles, devices such as missiles which may not be conventionally classified as vehicles, underwater propeller- or rotor-driven vehicles or devices, or any other uses.

Figure 12:
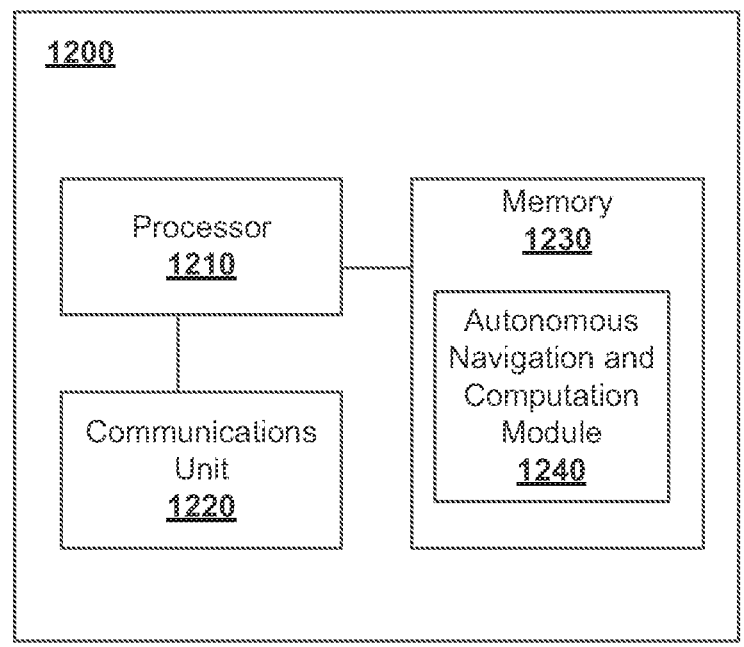
FIG. 12 illustrates, in component diagram, an example of an autonomous navigation and calculation system, in accordance with some embodiments.

FIG. 12 illustrates, in component diagram, an example of an autonomous navigation and calculation system 1200, in accordance with some embodiments. The system 1200 comprises a processor 1210 for processing operating instructions, a communications unit 1220 for communicating with a remote station, a memory 1230 that stores operating instructions for the system 1200, and an autonomous navigation and calculation module 1240 for performing any of the methods described herein. Other components may be added to the system 1200.

The embodiments of the devices, systems and processes described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding control and computing devices. It should be appreciated that the use of such terms may represent one or more computing devices having at least one processor configured to execute software instructions stored on a computer readable tangible, non-transitory medium. For example, a remote station 102, 240, 250, 500 may have a server that includes one or more computers coupled to a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product instructing physical operations, such as controlling movement of the UV 110, for example. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the processes provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and processes implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The processor or controller 308, 408, remote or ground station 240, or client device 250, 500 may be implemented as a computing device with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, microelectromechanical systems (MEMS) or micro-size mechanical devices, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the processes described herein.

A processor may be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

Data storage device may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device may include an I/O interface to enable computing device to interconnect with one or more input devices, such as a keyboard, mouse, camera, touch screen and a microphone, or with one or more output devices such as a display screen and a speaker.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, processes and steps described in the specification. As one of ordinary skill in the art will readily appreciate from the disclosure of the present invention, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

As can be understood, the examples described above and illustrated are intended to be exemplary only. The scope is indicated by the appended claims.

The invention claimed is:

1. An unmanned vehicle (UV) navigation system comprising:
    a processor;
    a communication interface for communicating with a remote station; and
    a non-transitory memory device storing machine-readable instructions that, when executed by the processor, causes the processor to navigate the UV, the processor configured to:
    receive data from sensors, camera or data line for UV processor analysis;
    navigate the UV while using a wireless communication link;
    determine that a link-free trigger event has occurred; and
    autonomously navigate the UV in response to the trigger event without using the communication link or with a reduced use of the communication link;
    wherein the link-free trigger event comprises:
        (a) a link-related event comprising a natural failure of the communication link; or
        (b) a first-type event comprising at least one of:
            (i) detection, through an on-board surveillance subsystem, of a pre-determined target whose image or other data may have been uploaded to the vehicle from the control station and whose identity may have been selected for autonomous detection by the control station;
            (ii) detection of a change in a characteristic of a specified target;
            (iii) detection of an indication that the presence of the UV has been detected by a hostile party; and
            (iv) detection, by the vehicle's communication subsystem or by another wireless sensing subsystem, of jamming or attempted jamming of the communications link;
    wherein autonomously navigating the UV comprises:
        (A) for the link-related event,
            determining whether a link-free mode is enabled;
            if the link-free mode is enabled, then performing a link-free mode link failure action;
            if the link-free mode is not enabled, then performing a regular mode link failure action which is different from the link-free mode link failure action;
        (B) for the first-type event, deactivating the UV's wireless transmitter.

2. The UV navigation system as claimed in claim 1, wherein for the link-related event, the processor is configured to navigate the UV to return to a known location.

3. The UV navigation system as claimed in claim 2, wherein for the link-related event, upon re-establishing the communication link, the processor is configured to navigate the UV to the pre-set course or pre-programmed mission prior to the communication link failure.

4. The UV navigation system as claimed in claim 1, wherein:
    navigating the UV while using the communication link comprises controlling the UV by an operator via a remote operator station;
    autonomously navigating the UV is performed without using the communication link; and
    for the first-type event, the processor is configured to at least one of:

navigate the UV to continue its pre-set course or pre-programmed mission; or use on-board logic to determine a new course of action.

5. The UV navigation system as claimed in claim 1, wherein the processor is configured to enable or disable the link-free mode in response to a command received via the communication link.

6. The UV navigation system as claimed in claim 5, wherein the UV navigation system comprises a variable corresponding to enablement of the link-free mode, and the variable is programmatically set or cleared in response to the command received via the communication link.

7. The UV navigation system as claimed in claim 1, wherein in response to the first-type event, the processor is configured to at least one of:

navigate the UV to return to a known location;

navigate the UV to continue its pre-set course or pre-programmed mission;

use on-board logic to determine a new course of action;

communicating to the control station the trigger condition;

modify the vehicle's mission or flight plan to avoid areas;

cause the UV to drop a package at a specific set of coordinates;

modify the navigation path of the UV;

search for a specified target;

turn a radio of the UV on or off;

send an alert message;

take an image or video feed using a camera or sensor data of the UV;

change camera settings of the camera of the UV; or change radio settings of the radio of the UV.

8. The UV navigation system as claimed in claim 1, wherein:

the processor is configured to determine the presence of a dark zone; and the processor is configured to inhibit radio transmissions to enter the dark zone.

9. The UV navigation system as claimed in claim 8, wherein the processor is configured to:

cause a sensor or camera on the UV to take data, image, or video feed of a view of the dark zone;

navigate the UV outside the dark zone;

re-establish radio transmissions with a remote station; and transmit the image or video feed to the remote station.

10. The UV navigation system as claimed in claim 1, wherein for the first-type event, the processor is configured to:

determine whether the link-free mode is enabled;

if the link-free mode is enabled, then perform a first link-free mode link failure action;

if the link-free mode is not enabled, then perform a first regular mode link failure action which is different from the link-free mode link failure action.

11. A method for navigating an unmanned vehicle (UV), the method comprising:

receiving data from sensors, camera or data line for UV processor analysis;

navigating the UV while using a wireless communication link;

determining that a link-free trigger event has occurred, the link-free trigger event comprising a natural communication link failure or a threat detection; and autonomously navigating the UV in response to the link-trigger event without using the communication link or with a reduced use of the communication link;

wherein the threat detection comprises at least one of:

(i) detection, through an on-board surveillance subsystem, of a pre-determined target whose image or other data may have been uploaded to the vehicle from the control station and whose identity may have been selected for autonomous detection by the control station;

(ii) detection of a change in a characteristic of a specified target;

(iii) detection of an indication that the presence of the UV has been detected by a hostile party; and (iv) detection, by the vehicle's communication subsystem or by another wireless sensing subsystem, of jamming or attempted jamming of the communications link;

wherein autonomously navigating the UV comprises:

(A) for the natural communication link failure, determining whether a link-free mode is enabled;

if the link-free mode is enabled, then performing a link-free mode link failure action;

if the link-free mode is not enabled, then performing a regular mode link failure action which is different from the link-free mode link failure action;

(B) for the threat detection, deactivating the UV's wireless transmitter.

12. The method as claimed in claim 11, wherein navigating the UV while using the communication link comprises controlling the UV by an operator via a remote operator station;

wherein autonomously navigating the UV is performed without using the communication link; and further comprising navigating the UV to return to a known location.

13. The method as claimed in claim 12, wherein upon re-establishing the communication link, further comprising navigating the UV to the pre-set course or pre-programmed mission prior to the link-free trigger event.

14. The method as claimed in claim 11, further comprising:

receiving commands via the communication link to enable or disable the link-free mode; and enabling or disabling the link-free mode in response to the commands.

15. The method as claimed in claim 11, wherein the link-free trigger event comprises a natural communication link failure comprising a degradation in link quality; and autonomously navigating the UV further comprises at least one of:

navigating the UV to continue its pre-set course or pre-programmed mission; or using on-board logic to determine a new course of action.

16. The method as claimed in claim 11, wherein the link-free trigger event comprises a threat detection.

17. The method as claimed in claim 14, wherein the UV navigation system comprises a variable corresponding to enablement of the link-free mode, and the variable is programmatically set or cleared in response to the commands.

18. The method as claimed in claim 11, further comprising:

determining the presence of a dark zone; and inhibiting radio transmissions when entering the dark zone.

19. The method as claimed in claim 18, further comprising:

causing a sensor or camera on the UV to take data, image, or video feed of a view of the dark zone;

navigating the UV outside the dark zone;

re-establishing radio transmissions with a remote station; and transmitting the image or video feed to the remote station.

20. The method as claimed in claim 11, wherein the link-free trigger event comprises a natural communication link failure.

\* \* \* \* \*